United States Patent [19]

Tazaki

[11] Patent Number: 4,695,824

[45] Date of Patent: Sep. 22, 1987

[54] INK STORING APPARATUS WITH A FIRST CASE HAVING PLURAL INK TANKS AND SECOND CASE HAVING ONE INK TANK AND A WASTE INK RECEPTACLE

[75] Inventor: Shigemitsu Tazaki, Matsudo, Japan

[73] Assignee: Canon Kabushiki Kaisha, Tokyo, Japan

[21] Appl. No.: 786,176

[22] Filed: Oct. 10, 1985

Related U.S. Application Data

[63] Continuation of Ser. No. 489,092, Apr. 27, 1983, abandoned.

[30] Foreign Application Priority Data

May 10, 1982 [JP] Japan ................................ 57-76617

[51] Int. Cl.[4] ............................................ G01D 15/16

[52] U.S. Cl. ............................................... 346/140 R

[58] Field of Search ........................................ 346/140

[56] References Cited

U.S. PATENT DOCUMENTS

| | | | |
|---|---|---|---|
| 3,056,384 | 10/1962 | Beale et al. | 118/411 |
| 3,121,138 | 2/1964 | Murphy | 178/5.2 |
| 3,386,102 | 5/1968 | Scheuzger et al. | 346/140 |
| 3,482,258 | 12/1969 | Steen | 346/140 |
| 3,945,022 | 3/1976 | Distler | 346/75 |
| 4,121,222 | 10/1978 | Diebold | 346/75 |
| 4,148,041 | 4/1979 | Rosenstock | 346/140 |
| 4,183,031 | 1/1980 | Kyser et al. | 346/140 |
| 4,291,317 | 9/1981 | Corwin et al. | 346/140 |
| 4,320,406 | 3/1982 | Heinzl | 346/140 |
| 4,329,698 | 5/1982 | Smith | 346/140 |
| 4,367,482 | 1/1983 | Heinzl | 346/140 |
| 4,383,263 | 5/1983 | Ozawa | 346/140 |
| 4,437,104 | 3/1984 | Hudson | 346/140 |
| 4,447,820 | 5/1984 | Terasawa | 346/140 |
| 4,590,495 | 5/1986 | Okamura | 346/140 |

FOREIGN PATENT DOCUMENTS

| | | |
|---|---|---|
| 2709730 | 7/1978 | Fed. Rep. of Germany . |
| 2812562 | 9/1979 | Fed. Rep. of Germany . |
| 55-142658 | 7/1980 | Japan . |

OTHER PUBLICATIONS

Catalog No. 25, Techni-Tool, Inc. 1981.

*Primary Examiner*—Joseph W. Hartary
*Attorney, Agent, or Firm*—Fitzpatrick, Cella, Harper & Scinto

[57] ABSTRACT

An ink storing apparatus for an ink jet printing device includes a first case for storing a plurality of colored inks and a second case for storing black ink and having a receptacle for accepting waste ink from the printing device. Both cases are detachable from the printing device so that the first case and the printing device may remain connected when the second case needs to be replaced to replenish the black ink supply and provide a new waste ink receptacle.

10 Claims, 3 Drawing Figures

INK STORING APPARATUS WITH A FIRST CASE HAVING PLURAL INK TANKS AND SECOND CASE HAVING ONE INK TANK AND A WASTE INK RECEPTACLE

This application is a continuation of application Ser. No. 489,092 filed Apr. 27, 1983, now abandoned.

BACKGROUND OF THE INVENTION

1. Field of the Invention

This invention relates to an ink reservoir for an ink jet printer, and, more particularly, it is concerned with an ink reservoir for an ink jet printer, which has solved problems in connection with an ink storing tank and disposal of a waste ink collecting tank.

2. Description of the Prior Art

A polychromatic ink jet printer is provided with a plurality of ink cassettes, each containing therein an ink tank which stores different color of ink. These ink cassettes are installed in the printer in a freely mountable and dismountable manner. The inks in various colors stored in the ink cassettes are used for printing numerical figures and letters, or for producing picture images in monochrome or in polychrome using the various ink colors in combination. The colors of the ink which are typically used are cyan, magenta, yellow and black. For letter printing, black ink is usually used. For picture images output, black and the three other colors in combination are used.

In office work in general, letter printing is the main function of the printers, for preparing documents and reports on various activities. Even in those printers having multi-color printing functions and being capable of recording picture images such as graphical representations, etc., the prevailing work in their actual use is still the printing of letters and characters. As a consequence of this, the black ink is consumed much more rapidly than the inks in other colors. Needless to say, since the black ink is used not only for letter printing, but also for picture images as a matter of course, consumption of the black ink (or any color of ink used in large quantity for letter printing) is remarkably high in comparison with that of the ink of other colors. On special occasions other than the office work in general, ink of the other colors, e.g., blue may be used much more than ink for the letter printing. In such case, the ink cassette of the ink with the highest consumption requires frequent replacement as a matter of course.

On the other hand, when poor letter printing takes place in an ink jet printer, it is necessary from time to time to remove undesirable conditions such as foaming, etc. which are liable to cause poor printing. More concretely, in order to restore the normal printing function, a cap is put on the nozzle to draw out ink from it by a pumping pressure so that the ink may again be regularly fed to the nozzle end. Also, in order to avoid poor printing, there have been adopted various methods for example ink is ejected toward a cap without regard to printing to thereby maintain the distal end of the nozzle in a condition which enables normal printing to be always carried out.

Particularly, in an ink jet printer of the "on-demand" type, ink if often ejected without regard to printing (i.e. waste ink). Such waste ink should naturally be recovered, and the thus recovered waste ink should be stored. For this purpose, a waste ink tank or the like can be used. Such waste ink tank may be useful so far as its volumetric capacity is sufficiently large, but, to be consistent with a general tendency to size-reduction in ink jet printers as a whole, a waste ink tank per se cannot be made large. As a consequence of this, ink absorbing material in the waste ink tank where such waste ink is stored must be replaced at a definite time interval to avoid occurrence of problems such as overflowing of waste ink.

Moreover, when a waste ink tank is installed in the printing apparatus in an exchangeable manner, apart from the ink cassettes to store therein inks in a plurality of different colors, the space for receiving such ink cassettes and the waste ink tank becomes inevitably large with the consequent hindrance of size-reduction of the printing apparatus.

SUMMARY OF THE INVENTION

It is an object of the present invention to provide an ink reservoir of highly effective storage performance.

It is another object of the present invention to provide an ink reservoir which effectively contributes to size-reduction in the printing apparatus.

It is still another object of the present invention to provide an ink reservoir which facilitates replacement of the ink storing means including a waste ink tank.

It is other object of the present invention to provide an ink reservoir particularly effective for use in a polychromatic ink jet printer.

The foregoing objects, other objects as the well as specific construction and function of the ink reservoir according to the present invention will become more apparent and understandable from the following detailed description thereof when read in conjunction with the accompanying drawing.

DESCRIPTION OF A PREFERRED EMBODIMENT

Figure 1:
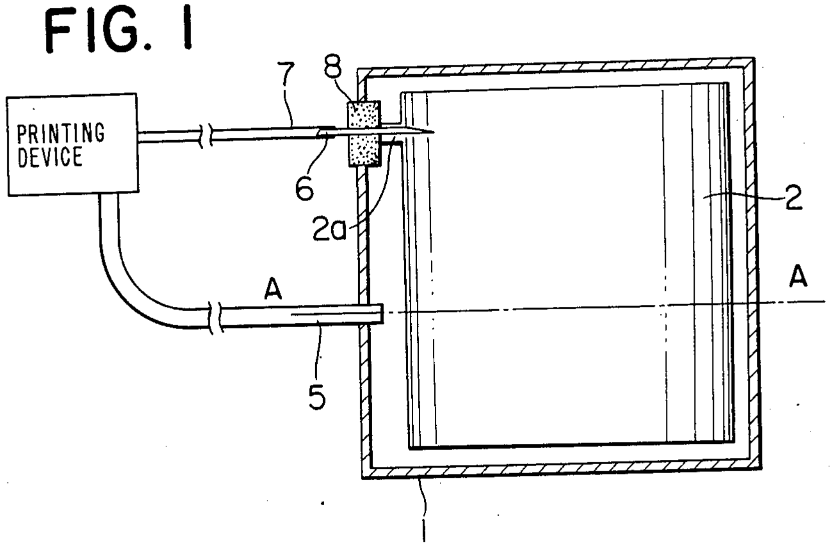
FIG. 1 is a plan view explaining a preferred embodiment of the ink reservoir according to the present invention.

In the following, the present invention will be described in detail in reference to a preferred embodiment thereof as shown in the drawing.

Figure 2:
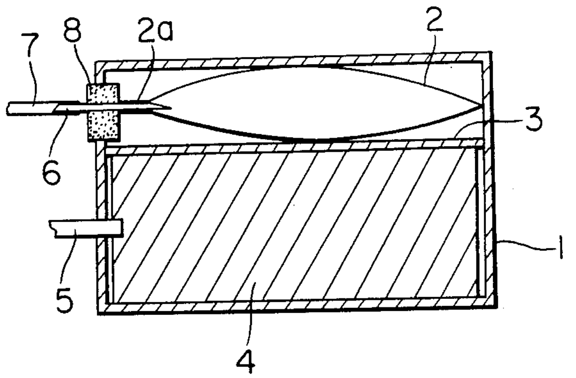
FIG. 2 is a cross-sectional view of the ink reservoir shown in FIG. 1, taken along a line A—A therein.

Referring to FIGS. 1 and 2 explaining a preferred embodiment of the ink reservoir according to the present invention, a reference numeral 1 designates a substantially flat case for receiving ink cassettes. This ink cassette case 1 is divided into upper and lower spaces or storing portions mutually isolated by a partition plate 3. The upper space or storing portion receives and holds therein an ink tank 2 of an elastic material and the lower space or storing portion houses therein a waste ink absorbing material 4 to form the waste ink reservoir. In this embodiment, the spaces for the ink cassette and the waste ink tank are formed in the direction of the thickness of the ink cassette case 1, the upper space portion being for the ink tank and the lower space or storing portion being for the waste ink tank. Such design is preferable from the point of enabling the ink to be circulated in accordance with the force of gravity.

The waste ink absorbing material 4 is connected with a pump which sucks thereinto, and discharges therefrom, ink from a printing device that includes an ink jet nozzle (not shown in the drawing) through a tube 5 as an ink inlet port, and the waste ink passes through the tube 5 and is absorbed into the ink absorbing material 4. By the way, this ink tube 5 is freely connectable and disconnectable to enable the ink cassette case 1 to be put into, and taken out of, the printing device.

On the other hand, the ink tank 2 is connected in fluid communication with the printing devices ink jet nozzle (not shown in the drawing) through a tube 7 having a needle 6. The needle 6 is intromitted into a rubber stopper 8, as an ink outlet port, to be connected for fluid communication with an ink feeding port 2*a* of the ink tank 2, which also communicates with the rubber stopper 8 at its other side.

As shown in FIG. 1, the rubber stopper 8 and the ink tube 5 are disposed at isolated positions so as not to be close or in contact each other. This facilitates intromission of the needle 6 into the rubber stopper 8 as well as connection of the tube 5 with the waste ink reservoir 4.

Thus, when both ink feeding tank 2 and waste ink absorbing material 4 are accommodated in one and the same ink cassette case 1, there is no necessity for separate provision of the waste ink tank, hence the space to be occupied by it in the printing device can be made small.

Further, when the ink to be stored in the ink tank 2 is of a color of the highest consumption, e.g. black or similar color, the ink cassette storing therein such ink is more often replaced than the other ink cassettes for different colors of ink, hence the waste ink absorbing material 4 is accordingly replaced at the same frequency as that of the ink cassette, whereby staining of a printing apparatus and the printing sheet due to overflow of waste ink can be prevented.

Figure 3:
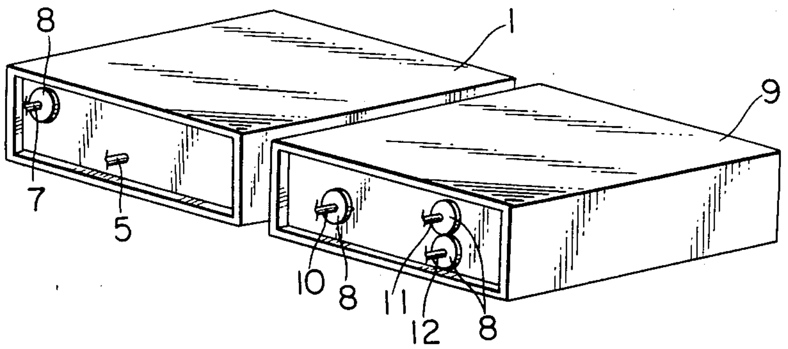
FIG. 3 is a perspective view showing a polychromatic ink jet printer, in which the embodiment of the present invention is adopted.

FIG. 3 illustrates one embodiment of the present invention when it is applied to a polychromatic ink jet printer. In this embodiment, a first ink cassette case 9 contains therein a plurality of ink tanks (not shown), each storing therein ink of different color, and the ink is fed to the printing devices ink jet nozzle (not shown) through each of the tubes 10, 11 and 12 connected with the ink cassette by way of rubber stoppers 8 in the cassette 9.

Incidentally, the embodiment shown in FIGS. 1 and 2 is of such a construction that the ink cassette case 1 (the second ink cassette case in FIG. 3) is divided into upper and lower portions (first and second storing portions, respectively) by means of the partition plate 3. However, it is, of course, possible that the partition plate 3 is provided in the vertical direction to divide the ink cassette case 1 interior into left and right portions.

Furthermore, it is possible for the ink to be directly stored in the case 1 without use of the ink cassette (or tank) placed in the inner space of the case 1.

It is also possible for the rubber stopper to be provided on the wall surface of the ink cassette case at the lower portion thereof for the waste ink tank, as is the case with the upper portion thereof for the ink feeding tank, so that, upon insertion of the needle into the stopper, the waste ink absorbing material and the tube may become communicatively connected.

As will become apparent from the foregoing explanation, the preferred embodiment of the ink reservoir according to the present invention is of such a construction that both ink tank and waste ink absorbing material are housed in one and the same ink cassette case, on account of which there is no necessity for providing a separate ink tank for waste ink, and a space to be occupied by the waste ink tank within the printing device can be reduced, which contributes to providing a printing apparatus with a reduced size.

In addition, when the ink in the ink feeding tank, which is accommodated in the second ink cassette case together with the waste ink absorbing member, is the ink with the highest rate of consumption, replacement of the ink cassette is done frequently, which provides for replacement of the waste ink absorbing material at the same frequency. As a consequence of this, neither the printing apparatus nor the printing sheet is stained due to overflow of the waste ink.

What I claim is:

1. An ink storing apparatus for a printing device, the apparatus comprising:

at least one first ink storing means including a first case for storing a first ink and being detachably connectable with the printing device; and a second ink storing means including a second case integrally having a first storing portion for internally storing a second ink and a second storing portion for storing waste ink, said second ink storing means being detachably connectable with the printing device, wherein said first ink storing means and the printing device remain connected when said second ink storing means is disconnected from the printing device and wherein said second ink is preselected to be used at a faster rate than said first ink.

2. The ink storing apparatus as set forth in claim 1, wherein the second ink stored in said first storing portion is of a substantially black color.

3. The ink storing apparatus as set forth in claim 2, wherein said first case includes a plurality of storing portions for storing different kinds of inks.

4. The ink storing apparatus as set forth in claim 13, wherein said first case stores a plurality of colored inks.

5. The ink storing apparatus as set forth in claim 4, wherein said first ink storing means and said second ink storing means have substantially identical physical dimensions.

6. The ink storing apparatus as set forth in claim 1, wherein a resilient ink tank is housed in said first storing portion wherein the second ink is stored in said resilient ink tank.

7. The ink storing apparatus as set forth in claim 6, wherein said second storing portion contains therein an absorbent member for retaining the waste ink.

8. The ink reservoir as set forth in claim 7, wherein said first and second storing portions are mutually disconnected by a partition plate.

9. The ink reservoir as set forth in claim 7, wherein said first and second storing portions are arranged so that said ink tank is on top of said absorbent member when said second ink storing means is connected to the printing device.

10. The ink storing apparatus as set forth in claim 1, wherein the first storing portion of the second ink storing means is adapted to contain a greater amount of ink than said first ink storing means.

* * * * *

UNITED STATES PATENT AND TRADEMARK OFFICE

CERTIFICATE OF CORRECTION

PATENT NO. : 4,695,824

DATED : September 22, 1987

INVENTOR(S) : SHIGEMITSU TAZAKI

It is certified that error appears in the above-identified patent and that said Letters Patent is hereby corrected as shown below: Title page:

AT [54] IN TITLE

"AND SECOND" should read --AND A SECOND--.

COLUMN 1

Line 3, "AND SECOND" should read --AND A SECOND--.
Line 58, "methods" should read --methods;--.
Line 64, "if" should read --is--.

COLUMN 2

Line 26, "other" should read --another--.
Line 29, "the well as" should read --well as the--.
Line 64, "space portion" should read --storing portion--.

COLUMN 3

Line 11, "devices" should read --device's--.
Line 43, "devices" should read --device's--.

UNITED STATES PATENT AND TRADEMARK OFFICE
CERTIFICATE OF CORRECTION

PATENT NO. : 4,695,824

DATED : September 22, 1987

INVENTOR(S) : SHIGEMITSU TAZAKI

It is certified that error appears in the above-identified patent and that said Letters Patent is hereby corrected as shown below:

COLUMN 4

Line 41, "claim 13," should read --claim 3,--.
Line 54, "reservoir" shoud read --storing apparatus--.
Line 57, "reservoir" shoud read --storing apparatus--.

Signed and Sealed this

Eighth Day of March, 1988

Attest:

DONALD J. QUIGG

Attesting Officer

Commissioner of Patents and Trademarks